Aug. 8, 1939.  J. E. BUTLER  2,168,322

CHANGE SPEED MECHANISM FOR BICYCLES

Filed Jan. 6, 1937   3 Sheets-Sheet 1

Inventor

J. E. Butler

By Clarence A. O'Brien
Hyman Berman
*Attorneys*

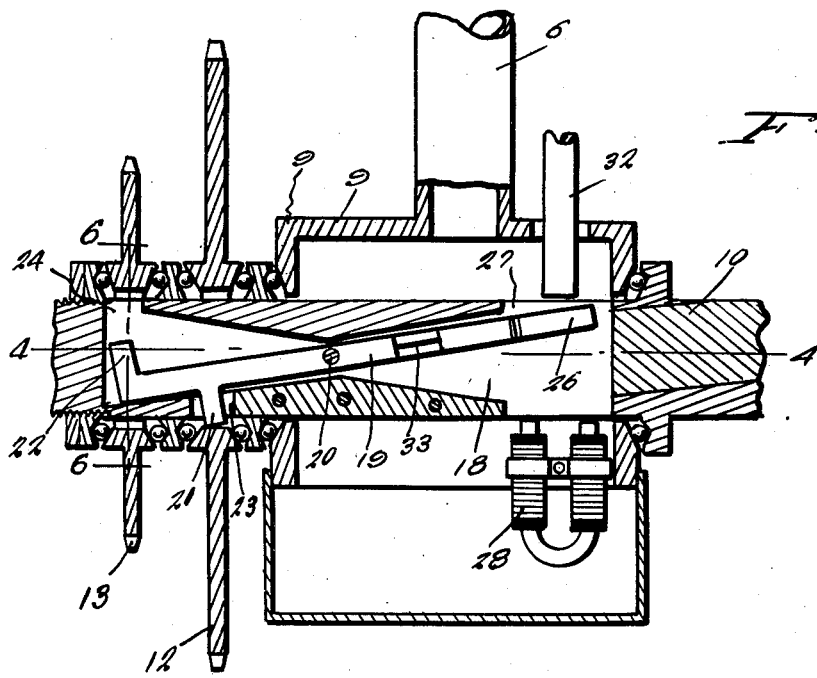
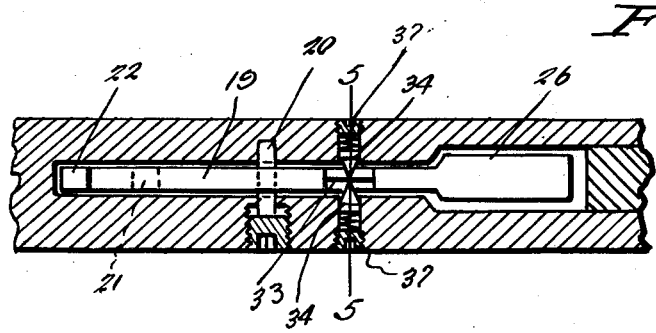
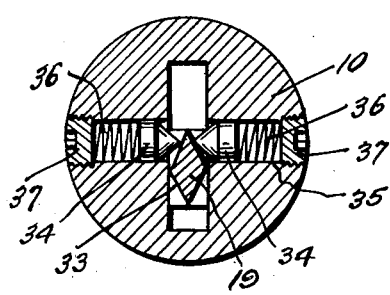

Aug. 8, 1939.  J. E. BUTLER  2,168,322
CHANGE SPEED MECHANISM FOR BICYCLES
Filed Jan. 6, 1937   3 Sheets-Sheet 3
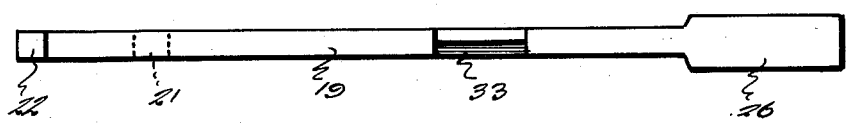
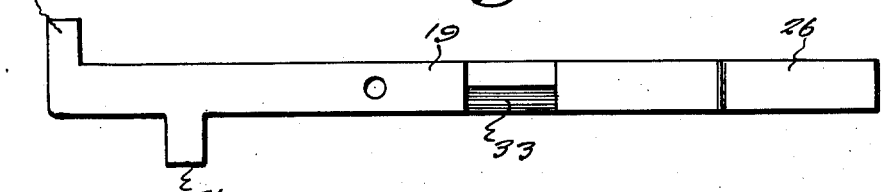
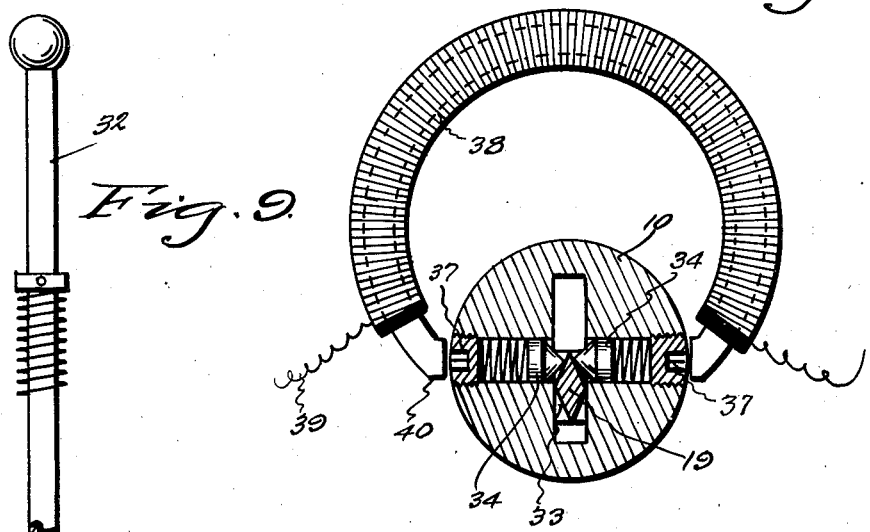
Inventor
J. E. Butler
By Clarence A. O'Brien
Hyman Berman
Attorneys Patented Aug. 8, 1939

2,168,322

UNITED STATES PATENT OFFICE 2,168,322

CHANGE SPEED MECHANISM FOR BICYCLES

James Edward Butler, Woodville, Ala.

Application January 6, 1937, Serial No. 119,334

7 Claims. (Cl. 74—217)

The present invention relates to bicycles and has for its principal object to provide a change speed mechanism therefor by means of which power exerted upon the pedals of the bicycle may be regulated and transmitted to the drive wheel in accordance to the conditions of the roadway over which the bicycle is traveling.

A further object is to provide electrical means for regulating the change in speed of the bicycle.

A still further object is to provide an apparatus of this character of simple and practical construction, efficient and reliable in performance, relatively inexpensive to manufacture and install in operation and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout and in which:—

Figure 3 is a transverse sectional view through the hub of the pedals, taken substantially on a line 3—3 of Figure 2.

Figure 4 is a sectional view taken along a line 4—4 of Figure 3.

Figure 5 is a transverse sectional view taken substantially on a line 5—5 of Figure 4.

Figure 7 is a top plan view of the pivoted lever for selectively connecting the drive pedals with the sprockets.

Figure 8 is a side elevational view thereof.

Figure 9 is a view in elevation of the manually operated auxiliary control lever.

Figure 10 is a detail of the auxiliary electro-magnet for releasing the lever.

Figure 1:
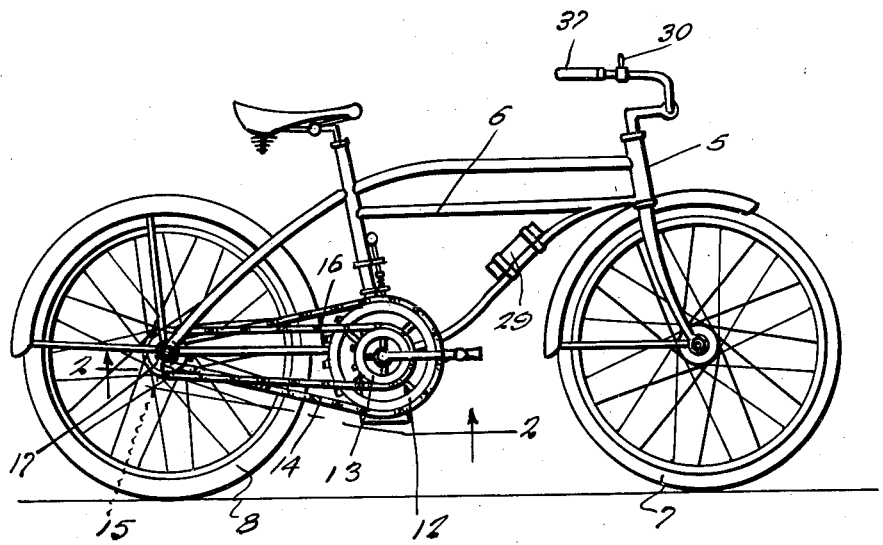
Figure 1 is a side elevational view of a bicycle embodying my invention.
Figure 2:
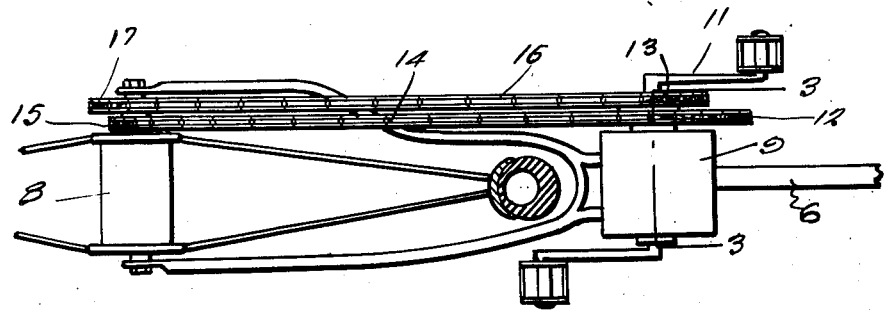
Figure 2 is a sectional view taken substantially on a line 2—2 of Figure 1.
Figure 6:
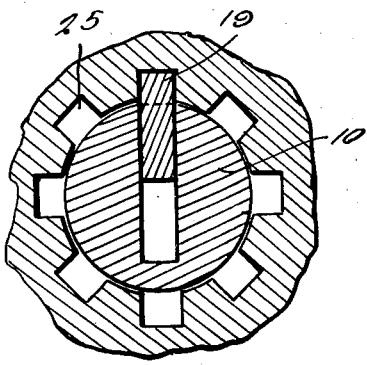
Figure 6 is a fragmentary sectional view through one of the sprockets, taken substantially on a line 6—6 of Figure 3.

Referring now to the drawings in detail, wherein for the purpose of illustration I have disclosed a preferred embodiment of the invention the numeral 5 designates a bicycle or similar vehicle generally which includes a frame 6 and front and rear wheels 7 and 8 respectively. A shaft housing 9 is supported from the frame within which a shaft 10 is journaled and from which the usual drive pedals 11 extend from each end thereof. At one end of the shaft 10, outwardly of the housing 9, and freely rotatable thereon, is a large sprocket wheel 12 and a relatively small sprocket wheel 13, the large sprocket wheel having a chain 14 trained thereover for driving a rear sprocket wheel 15 secured to the rear wheel 8 and the sprocket wheel 13 also has a chain 16 trained thereover for driving a rear sprocket wheel 17 which is of a size substantially equal to the front sprocket wheel 13 operatively associated therewith. The shaft 10 is provided with a longitudinally extending recess 18 within which a chain speed control lever 19 is pivotally mounted as at 20 intermediate its ends, said lever having laterally extending fingers 21 and 22 adjacent one end and extending in opposite directions as will be apparent from an inspection of Figures 3 and 8 of the drawings. The fingers 21 and 22 are adapted for movement outwardly of the shaft 10 through laterally extending openings 23 and 24, respectively, for feeding in recesses 25 formed on the inner periphery of the sprockets 12 and 13.

The opposite end of the lever 19 is provided with a head 26, adjacent which the shaft 10 is provided with a transversely extending opening 27 extending diametrically through opposite sides of the shaft. Mounted within the housing 9 is an electro-magnet 28 having an electrical connection with a storage battery 29 supported on the frame 6, the energization of said electro-magnet being controlled by a switch 30 mounted on the handle bars 31 of the bicycle.

It will be apparent from the foregoing that with the parts arranged in the position as shown in Figure 3 of the drawings that upon the energization of the electro-magnet 28 the head 26 of the lever 19 will be drawn toward the magnet to remove the finger 21 from engagement with the sprocket wheel 12 and to move the finger 22 into engagement with the sprocket wheel 13 whereby a change of speed in the driving of the bicycle will be effected from the large gear 12 to the smaller gear 13. In order to determine when the lever 19 is in a proper position for actuation by the electro-magnet to effect a change of speed movement one of the pedals 11 is secured to the axle 10 so as to extend in a forward horizontal direction, as shown in Figure 1 of the drawings, when the finger 21 of the lever is in engaged position with the large sprocket wheel 12 and accordingly the lever will then occupy a position for actuation by the electro-magnet to effect a change of speed from high speed to low speed, likewise when it is desired to change the speed of the bicycle from the low speed drive to the high speed drive the pedal 11 is given a one-half revolution so that the same will occupy a rearwardly extending horizontal position whereupon the position of the shaft 10 and lever 19 will be reversed from that shown in Figure 3 of the drawings and the transverse opening 27 in the shaft 10 will again be brought into registry with the electro-magnet 28 whereupon the lever may be actuated to disengage the finger 22 from the small gear 13 and to engage the finger 21 with the large gear 12.

Provision is also made for actuating the lever 19 manually, should the electrical equipment fail, this manual operating means comprising a spring retracted plunger 32 slidably carried by the frame 6 and having its lower end extending through the housing 9 for engagement by the head 26 of the lever when the lateral opening 27 in the shaft 10 is brought into proper registration therewith.

Provision is also made for securing the lever 19 in either of its engaged positions to prevent accidental disengagement with the sprocket wheels 12 and 13 and comprises a substantially diamond-shaped formation 33 in a portion of the lever 19, the oppositely inclined surfaces of which are engaged by a pair of conical plugs 34 slidably mounted in chambers 35 formed in the shaft 10 and yieldably held in engaged position with the lever 19 by springs 36 retained in the chambers by plugs 37. An electro-magnet 38 having electrical connection with the battery 29 through a wire 39 provided with inturned ends 40 positioned adjacent the plugs 37 so that upon energization of the electro-magnet 38 the slidable members 34 will be retracted from engagement with the lever and permit the pivotal movement thereof.

It is believed the construction and operation of the device will be readily understood from the foregoing without further detailed explanation thereof.

Having described the invention, what is claimed is:

1. A change speed mechanism for bicycles comprising a pedal operated drive shaft, a pair of sprocket wheels freely rotatable thereon, a lever pivotally carried by and enclosed within the shaft for selectively connecting said sprocket wheels for rotation therewith, and means free of the shaft and operable through openings in the shaft for actuating said lever into and out of sprocket engaging position.

2. A change speed mechanism for bicycles comprising a pedal driven shaft, a plurality of sprocket wheels mounted for rotation on said shaft, said sprocket wheels having recesses on the inner periphery thereof, a lever pivotally carried by and enclosed within the shaft, fingers on one end of the lever selectively engageable in the recesses of the respective sprocket wheels for operatively connecting the same to said shaft, and electromagnetically operated means operable through openings in the shaft for moving the lever into and out of sprocket engaging position.

3. A change speed mechanism for bicycles comprising a pedal operated shaft, a pair of sprocket wheels rotatably mounted on said shaft, means carried by and enclosed within the shaft for selectively connecting the sprocket wheels to the shaft for rotation therewith, electro-magnetic control means outwardly of the shaft and operable through openings in the shaft for manipulating said first named means and spring actuated means yieldably maintaining said first named means in sprocket engaging position.

4. A change speed mechanism for bicycles comprising a pedal operated shaft, a pair of sprocket wheels rotatably mounted on said shaft, means carried by the shaft for selectively connecting the sprocket wheels to the shaft for rotation therewith, electro-magnetic control means for said first named means, spring actuated means yieldably maintaining said first named means in sprocket engaging position, and electro-magnetic means for releasing said spring-actuated means.

5. A change speed mechanism for bicycles comprising a pedal operated shaft, a pair of sprocket wheels rotatably mounted thereon, each of said sprocket wheels having recesses on the inner periphery thereof, a pivoted lever carried by the shaft, fingers extending laterally from the lever for selective engagement with the recesses of said sprocket wheels to selectively connect the same for rotation with the shaft, and a spring retracted plunger adapted for moving the same into and out of sprocket engaging position.

6. A change speed mechanism for bicycles comprising a pedal operated shaft, a pair of sprocket wheels rotatably mounted thereon and having recesses on the inner periphery thereof, a longitudinal recess formed in the shaft, a lever pivotally mounted in said recess, said longitudinal recess having openings extending laterally through the sides of the shaft, fingers on the lever movable through certain of said lateral openings for engagement within the recesses of said sprocket wheels, an electro-magnetic means positioned adjacent certain of the other of said lateral openings in the shaft and operable when in registry with the openings for moving the lever into and out of sprocket engaging position.

7. A change speed mechanism for bicycles comprising a pedal operated shaft, a pair of sprocket wheels rotatably mounted thereon and having recesses on the inner periphery thereof, a longitudinal recess formed in the shaft, a lever pivotally mounted in said recess, said longitudinal recess having openings extending laterally through the sides of the shaft, fingers on the lever movable through certain of said lateral openings for engagement within the recesses of said sprocket wheels, and a spring retracted plunger operable into and out of certain of the other of said lateral openings in the shaft for engaging said lever to move the same into and out of sprocket engaged position.

JAMES EDWARD BUTLER.